S. HARRIS.
Weighing Scales.

No. 141,556.   Patented August 5, 1873.

Witnesses.
J. B. Connolly
E. Connolly

Inventor.
Sandy Harris
per Connolly Bros
his Atty's

UNITED STATES PATENT OFFICE.

SANDY HARRIS, OF PHILADELPHIA, PENNSYLVANIA.

IMPROVEMENT IN WEIGHING-SCALES.

Specification forming part of Letters Patent No. 141,556, dated August 5, 1873; application filed May 13, 1873.

*To all whom it may concern:*

Be it known that I, SANDY HARRIS, of Philadelphia, in the county of Philadelphia and State of Pennsylvania, have invented certain new and useful Improvements in Counter-Scales; and I do hereby declare the following to be a full, clear, and exact description of the invention, such as will enable others skilled in the art to which it pertains to make and use it, reference being had to the accompanying drawings which form part of this specification.

Figure 1:
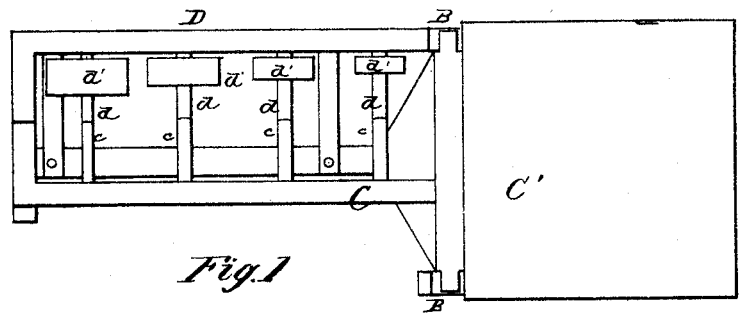
Figure 2:
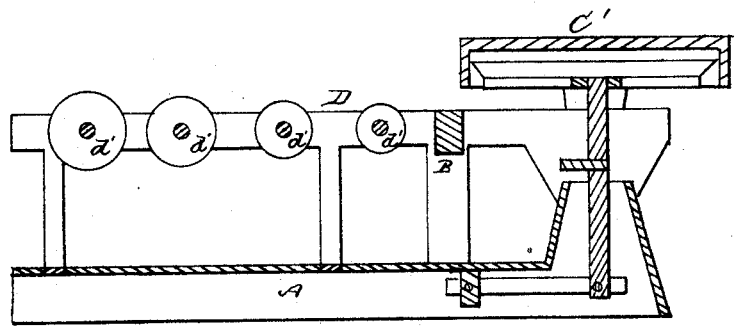

Referring to the drawings, Figure 1 is a plan view of my invention. Fig. 2 is a vertical longitudinal section of the same.

The object of my invention is to produce an arrangement whereby the weight shall not be liable to become lost or misplaced, but may be found, when not in use, in a certain position ready for adjustment on the beam. The nature of my invention consists in the employment of a fixed rack, on which are mounted weights in such manner that they can be brought upon the scale-beam by merely sliding them into position, and returned to place on such rack without being withdrawn from the scales. It also consists in the peculiar construction or adaptation of the beam for the reception of the weights, and in the combination of the fixed rack and weights with the beam.

Referring to the accompanying drawing, which illustrates a pair of scales with my improvements applied, A shows the base, provided with supports or fulcrums B B. C shows a beam, and C′ a platform which may be constructed for the reception of a tray. D is a fixed rack, provided with pins or pegs $d$, on which rest sliding weights $d'$ $d'$. Corresponding pins $c$ are arranged, as shown, upon the beam C. The amount or capacity of the weights is intended to be registered upon the beam, as shown.

When any article is required to be weighed a weight or weights equal to the amount needed is drawn from the rack D to the beam C, sliding upon a peg or pegs, $d$, to the corresponding peg or pegs $c$. When the weighing operation is completed the weight or weights should be restored by sliding the same back to position upon the rack.

The advantage of this form of construction, aside from its simplicity and slight cost of manufacture, is that the weights may always be found at hand when required, thus obviating the annoyance of searching for a lost or misplaced weight. Each weight, also, occupying a certain fixed distance from the platform, or a certain relation in the series, as first, second, and so on, the person using the scales will soon become accustomed to that position or relation, and be able to determine the amount of weight without the necessity of consulting the letters on the beam, a necessity which is frequently irksome in dark places, or to persons of weak or impaired vision.

Another advantage of this construction is that the dimensions of the weights need not be determined to a nicety before adapting them to the scale, as, when applied, if any one be found too weighty, it may be diminished in bulk until it will, at the desired point, balance the required amount on the platform. Or, no matter what may be the size or gravity of the weight, by locating its peg accordingly it may be made to balance any desired amount on the platform.

I have described these improvements as applied to what are known as "counter-scales," but it is obvious that they may be applied with advantage to others as well.

What I claim as my invention is—

1. The beam C, having the lateral pins $d$ projecting at intervals of different distances in a direct line from the fulcrum, in combination with the fixed rack D, having the corresponding pins and the sliding weights $d'$, substantially as shown and described.

2. Laterally-shifting balancing-weights, in combination with weight-scales having a fulcrum-beam adapted to receive said weights at different intervals of its length, substantially as and for the purpose specified.

In testimony that I claim the foregoing I have hereunto set my hand this 6th day of May, 1873.

SANDY HARRIS.

Witnesses:
J. W. HAMPTON, Jr.,
CHAS. F. GILLER.